UNITED STATES PATENT OFFICE.

JOHN W. BECKMAN, OF BERKELEY, CALIFORNIA.

METHOD OF SEPARATING SODIUM CARBONATE AND POTASSIUM CHLORID FROM NATURAL ALKALINE BRINES.

1,393,603.   Specification of Letters Patent.   Patented Oct. 11, 1921.

No Drawing.   Application filed July 23, 1919.   Serial No. 312,760½.

*To all whom it may concern:*

Be it known that I, JOHN W. BECKMAN, a citizen of the United States, and a resident of the city of Berkeley, county of Alameda, State of California, have made a new and useful Invention—to wit, Methods of Separating Sodium Carbonate and Potassium Chlorid from Natural Alkaline Brines; and I do hereby declare the following to be a full, clear, concise, and exact description of the same.

This invention relates to a process for the extraction of sodium carbonate and potassium chlorid from natural alkaline brines.

The object of the invention is to provide a process that is more expeditious and more thorough in the recovery of the elements contained in the brines to be treated. Under present methods in the recovery of sodium carbonate the other elements present in the brine treated, such as sodium sulfate, sodium chlorid, and potassium chlorid are waste products, being carried away in the mother liquor or in other steps incidental to processes prevailing at this time. By the process hereinafter described, it is possible to recover both sodium carbonate and potassium chlorid. In present practice, it is customary to heat the alkaline brines in vacuum pans by artificial means, such as steam.

In my improved process, the brine is at all times impounded in vats and subjected to solar evaporation entirely. Instead of depending upon the agency of artificial heat, I am employing solar evaporation, allowing said evaporation to take place until the residual deposit is of a semi-solid slushy consistency such as may be readily handled with shovels or spades. This residual slush is then leached out with boiling water, the quantity of which is determined by analysis of local conditions. Assuming, for the purpose of illustration, that we are treating a brine containing sodium carbonate, sodium bicarbonate, sodium sulfate, sodium chlorid, and potassium chlorid after the brine has been evaporated by solar heat to the slush state before mentioned, and the said residual slush has been leached in boiling water, it will be seen that the sodium sulfate, sodium chlorid and potassium chlorid have been dissolved by the boiling water and carried away in the leach liquor which is drained off leaving a slush residue of sodium bicarbonate and sodium carbonate. This solution is now evaporated primarily by solar heat to a suitable high concentration, then by artificial heat to a point where the sodium sulfate crystallizes in the evaporator. The solution which has been drained off is now agitated and filtered while hot which gives a precipitate containing sodium chlorid and sodium sulfate on the filter, while the liquor passing through the filter contains potassium chlorid which, when cool, crystallizes. The mother liquor is drained off of the crystals and returns to the solar vats for repeated operation and crystallization.

The residual slush resulting from the treatment contains sodium bicarbonate and sodium carbonate. To this slush I add a measured amount of water determined in amount by analysis and being sufficient in quantity for the desired solubility and containing one-third of one ton of sodium bicarbonate, or a mixture of carbonate and bicarbonate, in the shape of carbonated slime to each ton of slush treated. This mixture is agitated and during agitation, in order to obtain and preserve an equilibrium of all the salts present, a temperature of approximately forty degrees centigrade is maintained. This is an important feature in my process, and experiments have proven that forty degrees centigrade is the temperature best adapted to preserve the said equilibrium. The mixture is now filtered and washed to recover the sodium carbonate, sodium bicarbonate or a mixture of both, which is dried and calcined and the resultant product is finished sodium carbonate. The mother liquor which passes through the filter contains small quantities of sodium carbonate and other salts as well. The sodium carbonate is carbonated by the addition of carbonic acid which forms sodium bicarbonate which is obtained as a thick, unfilterable material in a Dorr thickener and returned into the process, using it as a solvent and precipitant in the step of the process where the slime was added. This procedure forms a salt that is easily filtered and the free liquor from the Dorr thickener is returned to the potash recovery liquor.

It will be seen that I have separated and recovered most of the sodium carbonate, while the mother liquor still contains in solution some sodium carbonate which is treated with carbonic acid and recovered in the form of a slush. In the Dorr thickener this slush is recovered and returned to the process as a matter of economy.

Having thus described my invention what I claim as new and desire to secure by Letters Patent of the United States is as follows:—

A method of separating sodium carbonate and potassium chlorid from natural alkaline brines consisting of subjecting the brines to solar evaporation until the residual deposit is of a semi solid or slushy consistency, then leaching out said deposit in boiling water, removing the leach liquor containing dissolved potassium chlorid to leave a slush residue containing sodium carbonate, evaporating the solution, primarily by solar heat and subsequently by artificial heat, to a point where crystallization takes place in the evaporator, agitating the drained off solution and filtering it while hot, cooling the liquor passing through the filter to recover the potassium chlorid by crystallization, then adding to the slush residue of the treatment a suitable amount of water containing one third of a ton of a sodium bicarbonate containing liquid in the shape of carbonated slime to each ton of slush treated, agitating the mixture at a maintained temperature of approximately 40 degrees centigrade, then filtering and washing the mixture and drying and calcining the resultant product.

In testimony whereof I have hereunto set my hand at San Francisco, California, this 19th day of June 1919.

JOHN W. BECKMAN.

In presence of—
A. J. HENRY.